United States Patent [19]

Naik

[11] 3,920,731
[45] Nov. 18, 1975

[54] DETERGENT COMPOUNDS

[75] Inventor: Appaya Raghunath Naik, Birkenhead, England

[73] Assignee: Lever Brothers Company, New York, N.Y.

[22] Filed: Aug. 29, 1974

[21] Appl. No.: 501,938

[30] Foreign Application Priority Data
Sept. 14, 1973 United Kingdom............ 43191/73

[52] U.S. Cl....... 260/485 H; 260/485 G; 260/485 J; 260/501.13; 260/534 R; 260/534 M
[51] Int. Cl.²............ C07C 101/20; C07C 103/30; C07C 135/02
[58] Field of Search.................. 260/485 J, 485 G

[56] References Cited
UNITED STATES PATENTS
3,751,451  8/1973  Samour et al.................. 260/485 H Primary Examiner—Lorraine A. Weinberger
Assistant Examiner—E. Jane Skelly
Attorney, Agent, or Firm—Arnold Grant, Esq.

[57] ABSTRACT

Novel betaines and amine oxides of generic formula:

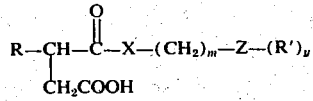

are derivable from alkenyl succinates and have good detergency in unbuilt formulations.

2 Claims, No Drawings

DETERGENT COMPOUNDS

This invention relates to novel betaines and amine oxides which are usable as detergent active materials.

These novel compounds can be prepared from materials derived from petrochemical sources and can be prepared by relatively simple chemical processes. They are usable in a wide range of detergent formulations, e.g. fabric washing formulations, dishwashing formulations and shampoos. These formulations can be built with the usual detergency builders for the appropriate formulations but these materials are also usable in unbuilt formulations.

The novel materials to which this invention relates are defined by the following generic formula:

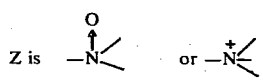

wherein
R is an alkyl or alkenyl group having from 10 to 18 carbon atoms (preferably 12 to 16)
x is —O— or —NH—
m is an integer from 1 to 6, pref. 2 or 3

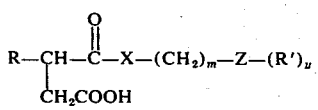

$R^1$ is an alkyl or hydroxyalkyl group having from one to three carbon atoms, the groups being the same or different
y is 2 when Z is amine oxide and 3 when Z is a quaternary nitrogen atom and the salts of the betaines.

The carboxy betaine, which can also be prepared as the salt, may be prepared by reacting the appropriate alkyl or alkenyl succinic anhydride with the appropriate amine: this intermediate is then subjected to quaternisation.

The compounds of the present invention demonstrate good detergency under both built and unbuilt conditions with respect to the removal of both unsaturated and saturated fat and protein. They are compatible with the detergency builders and surfactants described in "Surface Active Agents" by Schwartz and Perry (Interscience 1949) and "Surface Active Agents and Detergents" by Schwartz, Perry and Berch (Interscience 1958).

The R radical may be branched and this class of compound is obtained when the succinic anhydride has been prepared from the reaction of a vinyledene olefin and maleic anhydride.

The succinic anhydrides used as starting materials are available commercially and are prepared in general by the reaction of an alpha olefin with maleic anhydride. This reaction is described generally in "Maleic Anhydride Derivatives" by L. H. Flett & W. H. Gardner 1952, John Whiley & Sons Inc. Also in U.S. Pat. Nos.:

2,561,232
2,561,791
2,573,495
2,496,358

EXAMPLE 1

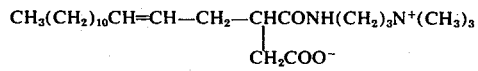

This compound relates to the generic formula by having
R is $C_{14}$ alkenyl
x is —NH—
m is 3

Z is —N$^+$⟨—

$R^1$ is methyl
y is 3

The compound was prepared as follows. The appropriate alkenyl succinic anhydride (0.2 moles) of formula

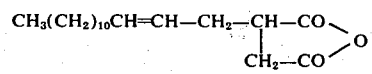

The compound was prepared as follows. The appropriate alkenyl succinic anhydride (0.2 moles) of formula

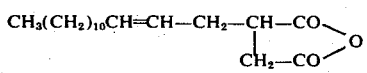

was placed in a reaction vessel and a solution of 3-dimethylamino propylamine (0.2 mole) in ethanol (500 ml) added to the anhydride over a period of 30 minutes with stirring at room temperature. Alternatively the anhydride can be added to the propylamine solution. The reaction can also be performed in the absence of a solvent such as ethanol or using another solvent. The solution was then stirred for a further 2 hours while maintained at 40°C to 50°C. A solution of alcoholic sodium hydroxide (0.2 moles) was then added at room temperature and the resulting solution filtered and evaporated to dryness. The product was the tertiary amine corresponding to the desired final product, i.e.,

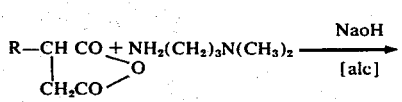

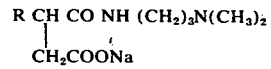

This intermediate was then quaternised by dissolving 0.05 mole in isopropanol containing 10% water. Methyl chloride was bubbled into the solution which was stirred and refluxed for 6 hours. Sodium chloride precipitated out and was removed by filtration. The solvent was removed by evaporation and the desired product isolated. The compound was characterised satisfactorily by analysis for carbon, hydrogen and nitrogen.

EXAMPLE II

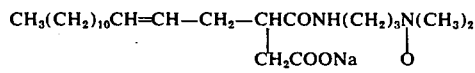

To prepare this amine oxide the same tertiary amine intermediate was used as in Example I.

The intermediate (0.05 mole) was dissolved in water (250 ml) and the solution heated to 70°–75°C with stirring. Hydrogen peroxide in excess was added over a period of 15 minutes. The reaction mixture was maintained at 70°–75°C for 4 hours and the excess of peroxide destroyed with sodium sulphite. The mixture was then evaporated to dryness and the amine oxide isolated by extraction with an alcohol, for example ethanol. The above formula was shown by analysis.

EXAMPLE III

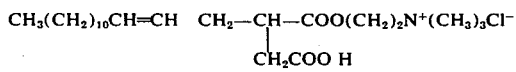

This compound relates to the generic formula by having

R is $C_{14}$ alkenyl
x is —O—
m is 2 z is $-N^+\!\!<$ $R^1$ is methyl
y is 3

In the preparation of the ester analogues the moiety carrying the quaternary or amine oxide is brought to its desired final form before forming the ester linkage. N-dimethylamino ethanol (0.5 mole) was dissolved in isopropanol (150 ml) and refluxed with stirring while methyl chloride was bubbled in. On cooling the quaternary chloride was filtered off in the form of needle crystals. The appropriate alkenyl succinic anhydride, as used in Example I, (0.1 mole) was dissolved in methyl cyanide (250 ml) and the quaternary chloride (10g, 0,072 mole) added. The mixture was refluxed with stirring to give a homogenous solution. After a further 2 hours refluxing the mixture was cooled to room temperature when the product precipitated. After filtration the product was purified by boiling with light petroleum (60°–80°C fraction) to remove unreacted succinic anhydride. The product was characterised satisfactorily by analysis for carbon, hydrogen and nitrogen. This product is the betaine hydrochloride and the parent ester betaine is obtained when this product is placed in an alkaline medium.

EXAMPLE IV

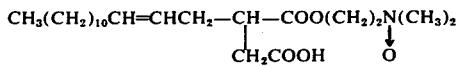

N-Dimethyl amino ethanol (0.5 mole) was dissolved in water (200 ml) and a slight excess of hydrogen peroxide added slowly while stirring at 75°–80°C. Stirring was continued for 2 hours after the addition. After destroying excess peroxide with sodium sulphite the solvent was removed and the amino oxide intermediate extracted with alcohol. The oxide was a viscous liquid. This 2-dimethylamino ethanol N-oxide (0.04 mole) was added to the alkenyl succinic anhydride of Example I (0.05 mole) dissolved in dichloromethane (100 ml). The mixture was refluxed for 2 hours and the solvent removed. The product was taken up in hot light petroleum, filtered and removed. The above formula was shown by analysis.

EXAMPLE V

The following compounds were prepared and tested for detergency using cotton test cloths soiled with sebum and washed in a Terg-O-Tometer. The compounds were used at 0.1% weight/volume with sodium alkaline silicate at 0.025% weight/volume to give a pH of 10. The wash temperature in the Terg-O-Tometer was 45°C and the water hardness 25° (calcium). The standard contained 0.05% sodium dodecyl benzene sulphonate, 0.1% sodium tripolyphosphate and 0.25% sodium alkali silicate. The detergency was measured using an Elrephro reflectometer and is the ratio of the difference in reflectance between the washed and the soiled materials to the difference in reflectance between the original and solid articles. It is expressed as a percentage.

| Compounds | x | m | Z | $R^1$ | y | R | Detergency % |
|---|---|---|---|---|---|---|---|
| A | —NH— | 3 | N→O | $CH_3$ | 2 | $C_{14}$ saturated | |
| | | | | | | $C_{16}$ saturated | 50 |
| | | | | | | $C_{18}$ saturated | |
| | | | | | | $C_{12}$ unsaturated | 75 |
| | | | | | | $C_{14}$ unsaturated | 67 |
| | | | | | | $C_{16}$ unsaturated | |
| | | | | | | $C_{18}$ unsaturated | |
| B | —NH— | 3 | $N^+$ | $CH_3$ | 3 | $C_{14}$ saturated | |
| | | | | | | $C_{16}$ saturated | 60 |
| | | | | | | $C_{18}$ saturated | |
| | | | | | | $C_{12}$ unsaturated | 77 |
| | | | | | | $C_{14}$ unsaturated | 71 |
| | | | | | | $C_{16}$ unsaturated | |
| | | | | | | $C_{18}$ unsaturated | |
| C | —O— | 2 | N→O | $CH_3$ | 2 | $C_{16}$ saturated | 67 |
| | | | | | | $C_{12}$ unsaturated | 54 |
| D | —O— | 2 | $N^+$ | $CH_3$ | 3 | $C_{16}$ saturated | 68 |
| (as chloride salt) | | | | | | $C_{12}$ unsaturated | 73 |
| | | | | | | $C_{14}$ unsaturated | |
| Standard formulation | | | | | | | 73 |

It will be seen from these results that the detergency of the test compounds, in the unbuilt condition, is of the same order as or excels that of the built standard.

It will be appreciated that these are unbuilt formulations, some compounds were also tested in a built formulation using 0.05% of the compound and 0.1% of a detergency builder with 0.025% of the silicate. The $C_{14}$ unsaturated compound from group A above gave the following results:

| Builder | Detergency |
|---|---|
| Sodium tripolyphosphate | 67 |
| Sodium carbonate | 74 |
| Sodium oxydiacetate | 66 |
| Sodium ethylene diamine tetra-acetate | 88 |
| Standard | 72 |

The $C_{14}$ unsaturated compound from group B was tested under the same conditions.

| Builder | Detergency |
|---|---|
| Sodium tripolyphosphate | 82 |
| Sodium carbonate | 85 |
| Sodium oxydiacetate | 69 |
| Sodium ethylene diamine tetra-acetate | 88 |

In the built state, the test compounds are superior in detergency to the built standard.

Typical fabric washing formulations using the compounds of the invention are:

| | |
|---|---|
| Compound A C$_{16}$ saturated | 40% |
| Sodium sulphate | 25% |
| Sodium silicate | 12% |
| Coconut ethanolamide | 3% |
| Sodium chloride | 10% |
| Sodium carboxymethyl cellulose | 0.65% |
| Remainder, perfume, fluorescer, water to | 100% |

| | |
|---|---|
| Compound B C$_{12}$ unsaturated | 22% |
| Sodium tripolyphosphate | 33% |
| Sodium sulphate | 19% |
| Sodium silicate | 11% |
| Coconut ethanolamide | 3% |
| Sodium chloride | 7% |
| Sodium carboxymethyl cellulose | 0.65% |
| Remainder, perfume, fluorescer, moisture to | 100% |

A typical dishwashing formulation is:

| | |
|---|---|
| Compound C C$_{16}$ saturated | 15% |
| Lauryl ether sulphate 3EO | 15% |
| Alkylamide | 2% |
| Water, ethanol, perfume to | 100% |

What is claimed is:

1. Chemical compounds of the formula

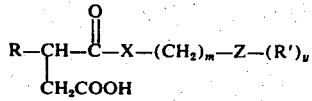

wherein
R is an alkyl or alkenyl group having from 10 to 18 carbon atoms
x is —O—
m is an integer from 2 to 3

Z is 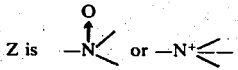

R$^1$ is an alkyl group having from one to three carbon atoms, the groups being the same or different
y is 2 when Z is amine oxide and 3 when Z is a quaternary nitrogen atom and the salts of the betaines.

2. Chemical compounds according to claim 1 wherein the alkyl or alkenyl group has from 12 to 16 carbon atoms.

* * * * *